May 21, 1940.  L. E. LAISNE  2,201,438
INDEPENDENT WHEEL SUSPENSION
Filed Oct. 25, 1935   2 Sheets-Sheet 1

Inventor
Leon E. Laisne
By
A. E. Wilson
Attorney

Patented May 21, 1940

2,201,438

UNITED STATES PATENT OFFICE 2,201,438

INDEPENDENT WHEEL SUSPENSION

Léon Edgard Laisne, Levallois Perret, France, assignor to Bendix Aviation Corporation, Chicago, Ill., a corporation of Delaware Application October 25, 1935, Serial No. 46,784
In France October 29, 1934

7 Claims. (Cl. 267—20)

This invention relates to vehicle suspension and has for its object to improve and simplify the construction of vehicle suspensions while permitting the wheels of a vehicle to be made fully independent.

The principal feature of this invention consists in forming the suspension of a wheel by means of an oscillating lever providing by or at its extremity a wheel axle, this lever being mounted, on an axle secured to or on the vehicle frame, with the interposition of a rubber liner effective to resiliently restrain the movement of the lever and absorb, by the internal work of rubber, the shocks. This rubber liner may be formed by a band of rubber rolled up on the supporting axle carried by the chassis or by a piece of moulded rubber of appropriate form, in one or in more than one part mounted around and preferably stuck on the supporting axle and compressed thereon by the split hub portion of the suspension lever. The rubber liner or liners may be made also in the form of disks interposed between suitable disks secured on the supporting axles and disk like portions of the suspension levers.

A further feature of the invention resides in the provision of means whereby the suspension of a vehicle may be regulated.

A still further feature of the invention resides in the provision of means insuring an automatic regulation of the suspension of a vehicle in accordance with the weight of the charge imposed.

Another feature of the invention resides in the provision of rubber liners, springs and torsion rods combined to provide suspension for heavy vehicles, this suspension being automatically adjustable in accordance with the weight of the charge imposed.

A still further feature of the invention resides in the provision of a single lever mounted, by means of a rubber liner, on an axis rigidly secured at the end of an aircraft strut, as means for suspending the landing wheel, this rubber liner being effective to insure the suspension and cushioning of the shocks.

The invention concerns more particularly different forms of embodiments as well as different forms of applications of these improvements in connection with suspension of automotive vehicles and landing wheel mountings for aircrafts, as will be apparent from the following description and the annexed drawings.

In these drawings:

Figure 2a is a plan view of the modified arrangement shown in Figure 1a;

Figure 1:
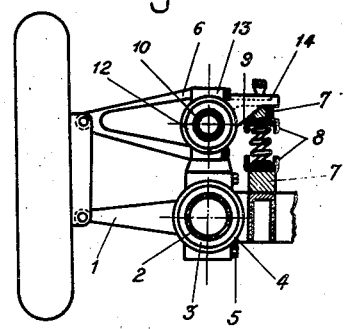
Figure 1 is a transverse sectional view of an automobile frame showing certain features of the invention.
Figure 2:
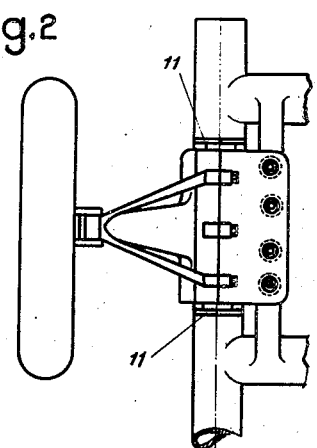
Figure 2 is a plan view of the arrangement shown in Figure 1.
Figure 2A:
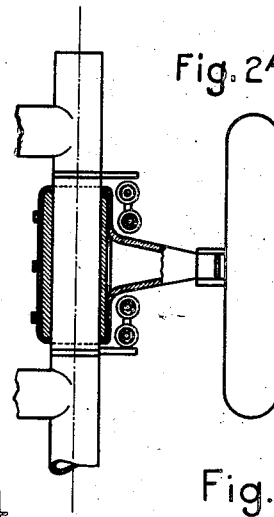
Figure 3:
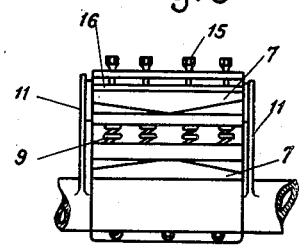
Figure 3 is a side view showing details of a part of the arrangement shown in Figure 1.

Referring to the drawings and particularly to Figures 1 to 3, there is shown a form of embodiment in which the suspension of a wheel is made by means of two oscillating levers forming an articulated parallelogram. As shown, this suspension comprises a main oscillating lever 1 pivotally mounted on a tubular longitudinal frame member 2, through the intermediary of a rubber liner 3 which may be formed by a rubber band rolled up on this tubular member, or still by one or more pieces of moulded rubber of appropriate form, this rubber liner being preferably stuck on the surface of the frame member 2. Lever 1 is provided at its base with a split hub portion 4 permitting the mounting of the lever on the frame member 2 and insuring a proper compression of the rubber to prevent any possibility of sliding. This compression is insured by tightening bolts 5 locking together the two parts of the base hub portion of the lever. A complementary lever 6, forming a part of the suspension parallelogram, is preferably mounted so as to take also an active part in the suspension. Thus, this lever is mounted on a complementary tubular member 10 carried on the main frame member 2 and fixed thereto by means of two spaced supports 11. This tubular member 10 is provided with a rubber liner 12 stuck thereon and compressed around it by the hub like base portion of the lever 6. Thus, the suspension of a wheel in this embodiment is insured by these two levers and their corresponding rubber liners which are effective to resiliently restrain and damp the movements of said levers.

These Figures 1 to 3 show further two forms of means permitting to insure the desired adjustment of the suspension described above.

The left hand part of Figure 1 shows a construction permitting automatic adjustment of the suspension in accordance with the intensity of the weight of the charge imposed thereon. As shown in Figures 1 and 3, these additional means comprise two parallel conically shaped rubber bands 7 carried respectively by the frame and an extension 14 of the complementary suspension lever 6 and several springs 9 of different lengths interposed between said rubber bands by means of two parallel U-shaped bearing members 8. The automatic adjustment of the suspension is insured thus by the difference in length of springs 9 which come into action successively one after another, according to the weight of the charge or intensity of the shocks, as well as by the form of rubber bands 7 which, due to their conical shape such as indicated in Figure 3, have only their central portions working when the charge is small, the effective working portion of these rubber bands progressively increasing with the increase of the charge applied. A certain manual adjustment is possible in this arrangement by the use of set screws 15 bearing against a plate 16 applied against the upper surface of the upper rubber band 7.

Figure 1A:
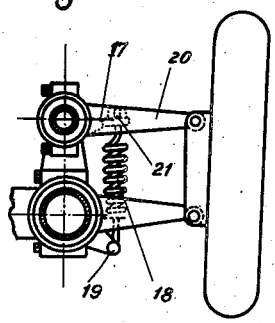
Figure 1a is a similar transverse sectional view of a modification of Figure 1.

Figure 1A shows a construction allowing only manual adjustment of the suspension. In this construction, there are provided springs 18 secured at their lower end to a support 19 fixed on the frame and at their upper extremity to a flange 17 on the complementary suspension lever 20, the adjustment being obtained by screwing or unscrewing the nuts 21. In the above examples, the frame of the vehicle was formed by two tubular longitudinal members 2 and cross members 22, electrically welded together and which present the advantage of permitting the mounting of the main suspension levers, such as 6, directly on the longitudinal tubular frame members such as 2, the whole forming an homogeneous assembly insuring a smooth suspension and proper independency of the wheels.

Figure 4:
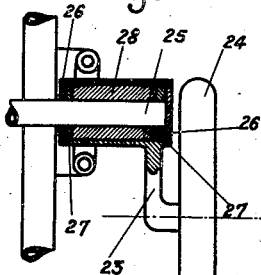
Figure 4 is a plan section view of a modification of Figure 1.
Figure 5:
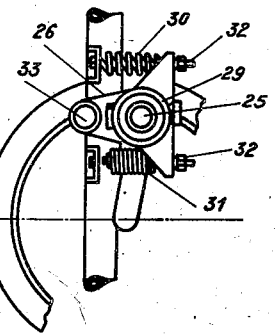
Figure 5 is a side view of the construction shown in Figure 4.

Figures 4 and 5 show another embodiment of the invention in which a wheel axle is caused to oscillate about a transverse axis relative to the frame so that the verticality of the wheel is preserved at all times. In this arrangement, there is a single oscillating lever 23 supporting the wheel 24. This lever is mounted on a cross member 25 which may be fixed on the frame by two supporting members 26 carried by a second transverse member 33.

Lever 23 is pivoted on the extremity of the transverse member 25 by means of two rings 27 and, as in previous example, a rubber liner 28, this rubber liner being fixed preferably by sticking on the transversal member 25 and compressed by the split hub portion 29 of the lever. For allowing the adjustment of the suspension, there are provided in this embodiment two springs 30—31 interposed on either side of the transversal supporting member 25 between the frame and a member oscillating together with lever 23, the adjustment being effected by screwing or unscrewing the nuts 32.

Figure 6:
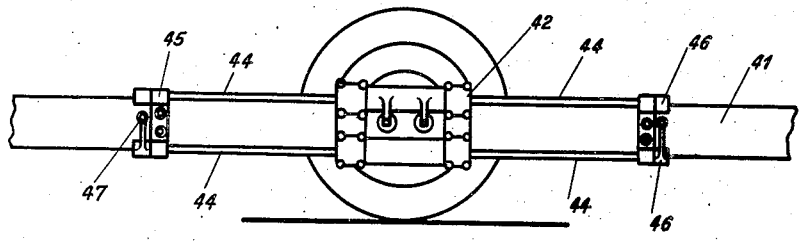
Figures 6, 7 and 8 show respectively side, plan and frontal views of a suspension automatically adjustable according to the weight of the charge, particularly applicable to heavy vehicles.
Figure 7:
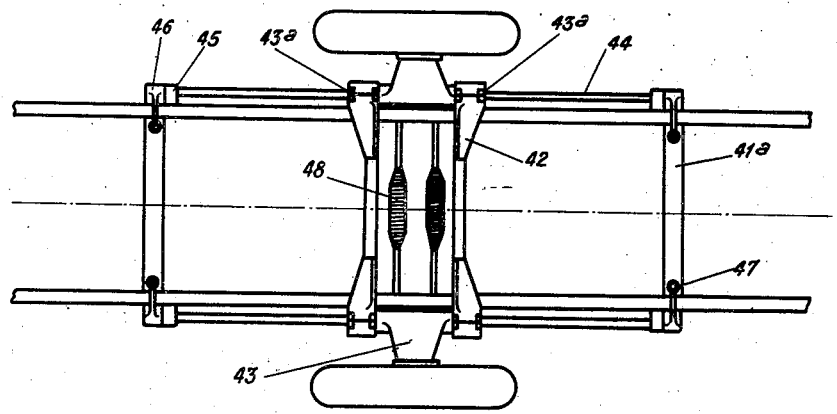
Figure 8:
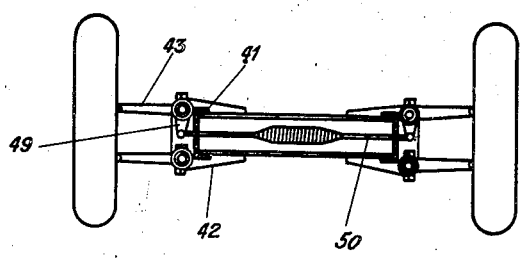

Figures 6 to 8 show a further modification of the invention which is characterized principally by the arrangement, the nature and the conjugation of different elements forming a combined suspension, specially adapted for heavy vehicles, as well as by the application of different resilient means adapted to operate separately or together, for obtaining the independency of wheels, an automatic regulation of the suspension in accordance with the weight of the load, the lowering of the frame and elimination of friction and necessity of lubrication. These Figures 6, 7 and 8 show a portion of a heavy vehicle provided with three different suspension devices combined together with a view to insure the automaticity and normal operation of each element of the suspension according to the weight of the load imposed.

In this embodiment, the suspension of a wheel on the frame 41 is insured by means of a support 42 secured on this frame, and a pair of suspension levers 43 mounted on said support 42 to oscillate about the axes parallel to the longitudinal axis of the frame. This pivotal mounting of the suspension levers 43 on the frame is realized preferably by means of aligned trunnions integral with the base portion of said levers and either journalled in two opposite antifriction bearings 43a carried by the support 42, or fixed into bearing cups, on said support 42, by means of rubber liners similar to those of previous examples, and effective to resiliently restrain and damp the movement of said levers. The opposite extremities of said bearing portions of levers 43 are rigidly connected with aligned torsion rods 44 extending parallelly to the longitudinal frame members 41 and journalled thereon by means of bearings 45. These rods are provided at their free ends with arms 46 extending perpendicularly to their axes and adapted to abut, respectively, for the rods connected with the upper suspension levers, against transversal frame members 41a and for the rods connected with the lower suspension levers on the side surface of the longitudinal frame members 41.

However, the torsion rods 44 are arranged so that their arms 46 are out of contact with frame members 41a and 41 unless a heavy weight is loaded on the vehicle or an important shock occurs. These torsion rods are adjustable by means of screws 47 so that they may be made to work separately or conjointly one with another and with other resilient suspension means such as rubber liners, or in case the suspension levers 43 are mounted in antifriction bearings, tension springs 48 interconnecting by pairs, by means of pull rods 50 and arms 49, the suspension levers 43 of two wheels on opposite sides of the frame.

Preferably the torsion rods 44 are adjusted so as to permit the normal suspension, to be insured by the resistance of rubber liners of suspension levers 43 or, in case these levers are mounted in antifriction bearings, by the resistance of tension springs such as 48, and become operative upon the occurrence of important shocks or, in case a predetermined weight is loaded on the vehicle. Furthermore, the torsion rods 44 may be adjusted so that they enter into action successively one after the other; for instance, two rods connected with the upper suspension levers 43 of each wheel may be adjusted to enter into action before the two rods connected with the lower suspension levers of each wheel. On the other hand, in the same manner, spring 48 may be adapted to become operative in successive stages one after another. It must be noted here that springs such as 48 produce a certain compensating action between the opposite wheels and that their tension may be regulated by screwing or unscrewing the same on pull rods 50 which are provided with oppositely threaded portions.

It will be appreciated then that the above described arrangement permits to have a suspension easily and automatically adjustable for any desired conditions of load.

There is thus provided a system of resilient shock absorbing mounting of vehicle wheels, which is relatively simple in structure, easy to assemble and maintain in working conditions and which possesses the advantage of smoothness of operation resulting from the use of the novel combination of the elements above described. It is to be understood however that the construction may be varied in any of its details, or in the relative arrangement of the parts.

Furthermore, it is understood that this invention is not limited to the sole use of rubber liners but cover the use of any other elastic material capable of fulfilling the same conditions as described in the specification.

It must be noted further that it has been found that proper damping qualities are obtainable from this system when the ratio between the mean radius of the liner or liners and the length of the lever arm should be approximately as 1:4 and that it is understood that this particular ratio is within the scope of the present invention.

What we claim is:

1. In a vehicle having a frame, an oscillating lever, a wheel supporting axle carried by one end of the lever, connecting means between the lever and the frame comprising a supporting member and a split hub, resilient means including a rubber liner interposed between the supporting member and the split hub and wrapped around the supporting member adapted to yieldingly connect the axle to the frame to absorb shocks transmitted from the axle to the frame, and yielding means interposed between said lever and frame and being proportioned to interpose increasing resistance as the load on the vehicle is increased.

2. In a vehicle having a frame, an oscillating lever, a wheel supporting axle carried by one end of the lever, connecting means between the lever and the frame comprising a supporting member and a split hub, resilient means including a plurality of rubber liners of varying thicknesses interposed between the supporting member and the split hub and wrapped around the supporting member adapted to yieldingly connect the axle to the frame to absorb shocks transmitted from the axle to the frame, an arm carried by the oscillating lever, yielding means interposed between the arm and the frame and being proportioned to produce resistance proportional to the load on the vehicle.

3. In a vehicle having a frame including longitudinally disposed members, spaced supporting axles on the longitudinally disposed members, a wheel, connecting means between the wheel and supporting axles carried by one of the longitudinally disposed members comprising two oscillating levers forming a vertically articulated parallelogram, yielding means including a resilient liner wrapped about the supporting axles, an arm carried by one of the oscillating levers, and yielding means between the arm and the frame member to interpose resistance proportional to the load on the wheel.

4. In a vehicle having a frame including longitudinally disposed members, spaced supporting axles on the longitudinally disposed members, a wheel, connecting means between the wheel and supporting axles carried by one of the longitudinally disposed members comprising two oscillating levers forming a vertically articulated parallelogram, yielding means including a resilient liner wrapped about the supporting axles, manually operable means to vary the tension to which the resilient liner is subjected, an arm carried by one of said oscillating levers, and yielding means interposed between the arm and the frame member to progressively increase the resistance to movement of the levers as the load on the wheel is progressively increased.

5. In a wheel suspension system for a vehicle, a frame including a pair of longitudinally disposed members, a transversely extending member, a pair of oscillating levers, a wheel carried at one end of said levers, two pairs of spaced support members carried by each longitudinally disposed member and adapted to receive a pair of said oscillating levers, yielding means including rubber liners interposed between said supports and levers, an arm carried by one of the oscillating levers, and yielding means interposed between the arm and the transversely extending member to progressively increase the resistance of the suspension system as the load on the vehicle is increased.

6. In a wheel suspension system for a vehicle, a frame including a pair of longitudinally disposed members, a transversely extending member, a pair of oscillating levers, a wheel carried at one end of said levers, two pairs of spaced support members carried by each longitudinally disposed member and adapted to receive a pair of said oscillating levers, yielding means including rubber liners interposed between said supports and levers, an arm carried by one of the oscillating levers of each pair of levers, and spring means interposed between said arms and said transversely extending member to progressively increase the resistance of the suspension system as the load on the vehicle is increased.

7. In a wheel suspension system for a vehicle, a frame including a pair of longitudinally disposed members, a transversely extending member, a pair of oscillating levers, a wheel carried at one end of said levers, two pairs of spaced support members carried by each longitudinally disposed member and adapted to receive a pair of said oscillating levers, yielding means including rubber liners interposed between said supports and levers, an arm carried by one of the oscillating levers of each pair of levers, spring means interposed between said arms and the transversely extending member to progressively increase the resistance of the suspension system as the load is increased, and manually operable means to vary the resistance of said spring means.

LÉON EDGARD LAISNE.